United States Patent Office 3,378,869
Patented Apr. 23, 1968

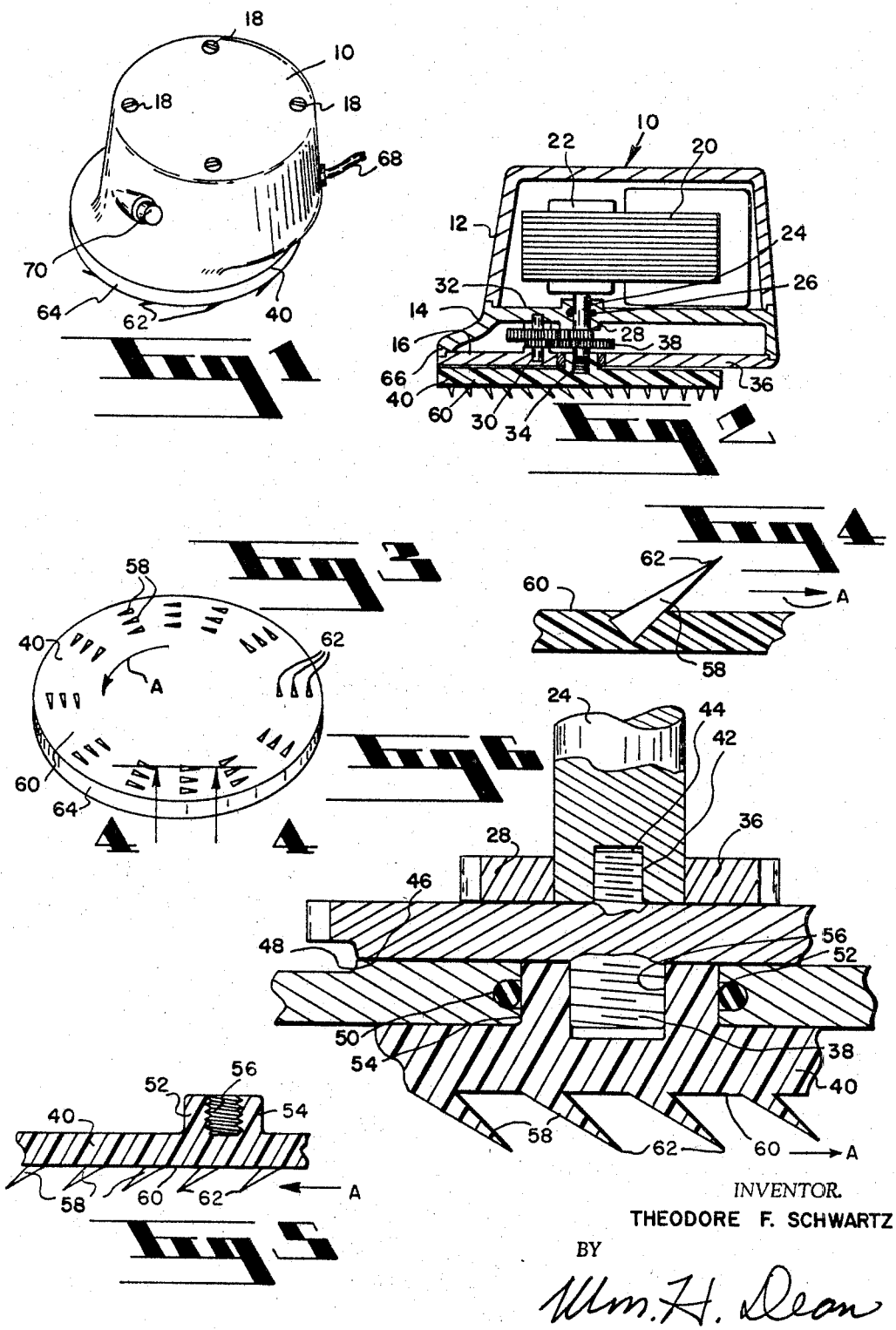

3,378,869
ELECTRIC POT SCRUBBER
Theodore F. Schwartz, 11660 St. Andrews Way,
Scottsdale, Ariz. 85718
Continuation-in-part of application Ser. No. 367,714,
May 15, 1964. This application May 26, 1966, Ser.
No. 560,036
6 Claims. (Cl. 15—93)

ABSTRACT OF THE DISCLOSURE

An electric pot scrubber comprising a motor driven disc having a plurality of scrubber teeth directed at an angle to the axis of rotation and generally in the direction of rotation, and adapted to impale a foraminous pad and/or to project therethrough, such that the ends of the teeth provide for scrubbing action on the bottom of a pot or pan; said teeth preferably made of tough flexible material, such as Teflon, nylon or any other suitable equivalent.

---

This application is a continuation-in-part of my copending application, Ser. No. 367,714, filed May 15, 1964, now forfeited.

This invention relates to an electric pot scrubber, and more particularly, to a very small compact motor driven appliance having a rotating disc driven through a reduction gear train by a small electric motor; the disc being provided with scrubbing teeth, either for holding a scrubbing pad or for applying abrasive material and scrubbing the surfaces of various pots and pans, the bottoms of ovens, walls, or other areas needing cleaning or abrasion, as desired.

Various electric pot scrubbers have been known in the art, and many of them utilize bristle brushes, discs with purse string pad holders, or special pads having peripheral flanges adapted to fit over a driven disc.

Many of these devices have been known in the prior art, but have been unsatisfactory due to their lack of versatility in the utilization of the scouring pads driven by such devices. Principally, these devices require special scouring pads especially fitted to the driven discs of the devices in order to maintain them in connected relation with the discs and to operate efficiently in the scouring or scrubbing of various surfaces, such as pots and pans, bottoms of ovens, and other areas, including woodwork, etc.

Prior art devices have been known, but have been inconvenient and costly to operate due to the fact that they require special scouring pads, and such pads must be secured on the driven discs of the devices in such a manner as to require considerable attention and care.

Accordingly, it is an object of the present invention to provide a pot scrubber having a novel driven disc provided with impaling teeth pointed generally toward the direction of rotation, whereby a pad may be impaled on an annular row or annular rows of such teeth, thereby interlocking the pad with the driven disc and permitting the utilization of a great variety of pad structures, such as, rags, stainless steel, conventional scouring pads made of Teflon, plastic, and many other materials.

Another object of the invention is to provide a pot scrubber having a power driven disc provided with fingers integral therewith; such fingers extended generally in the direction of rotation so that the points of the fingers are driven into a pad engaged by the fingers beneath the driven disc of the device in such a manner that annular rows of these fingers impale the pad and hold it very securely against radial displacement even though the pad may be eccentrically engaged on the driven disc, thus, greatly facilitating the engagement and the driving of any desired pad of a great variety of materials, and when used with detergents, scouring powders and other household facilities normally used for cleaning pots, pans, oven bottoms and the like.

Another object of the invention is to provide a very simple pot scrubber having a power output shaft on which a single piece pad driving or scouring disc is readily removable connected so that it may readily be replaced, as desired.

Another object of the invention is to provide a pot scrubber having a power driven scouring disc molded of a single piece of material with means readily removably connected to a driven shaft of the invention; said disc provided with scouring teeth on the normally bottom surface thereof; said scouring teeth being integral portions of the molded disc and which may be made of nylon, Teflon or any other tough flexible material desired for either holding a pad or for utilization directly as a scrubbing or scouring medium.

Another object of the invention is to provide a pot scrubbing device which is very compact and having a small motor and gear train housing with a pot scrubbing disc connected therewith and driven thereby; the periphery of the pot scrubbing disc being extended to an outer extremity of the motor and gear train housing, whereby the disc may be motivated and handled and maneuvered into sharp corners at the bottoms and sides of pans or other utensils or structures being cleaned or scrubbed thereby.

Another object of the invention is to provide a pot scrubbing device which may readily be utilized in areas in which the scrubber must be of necessity, be immersed in liquids.

Another object of the invention is to provide a very simple power driven pot scrubbing disc having pointed teeth arranged in annular rows on a disc concentrically around the rotating axis thereof; points of said teeth being directed at an angle to a rotating plane of the disc and in a direction of rotation of the disc, whereby they are driven into a pad or other device engaged therewith for impaling the pad and holding it while the disc is driven.

Further objects and advantages of the invention may be apparent from the following specification, appended claims and accompanying drawings, in which:

FIG. 1 is a perspective view of an electric pot scrubber in accordance with the present invention;

FIG. 2 is an axial section view thereof showing the housing of the pot scrubber, an electric motor therein, a reduction gear train and a novel pot scrubbing disc driven by a shaft in connection with the gear train;

FIG. 3 is a perspective view of the pad engaging or pot scrubbing surface of the disc illustrating pointed teeth arranged in annular rows and disposed at an angle to the plane of the disc and directed in a direction of rotation to be driven into and to impale a pad engaged by the surface of the disc;

FIG. 4 is an enlarged sectional view of the disc taken from the line 4—4 of FIG. 3, showing one of the teeth in connection with the disc;

FIG. 5 is a view of a modified form of the invention showing the disc and the teeth all cast of a single piece of material, such as Teflon, or the like, whereby the disc is readily expendable and replaceable, and wherein the teeth may serve both as scouring pad impaling devices and as a scrubbing medium to be used directly in connection with surfaces to be scoured and/or with scouring powder; and FIG. 6 is an enlarged fragmentary sectional view of a portion of the gear train and the scrubbing disc of the invention.

As shown in FIG. 1 of the drawings, the electric pot scrubber of the invention is provided with a housing 10 composed generally of three housing sections 12, 14 and 16, all held together by screws 18 which extend parallel to the axis of the device, as will be hereinafter described; said screws interconnect all of the aforementioned housing sections.

Disposed within the housing section 12 is an electric motor 20 having an armature 22 provided with an output shaft 24 which extends through a seal 26 in the housing section 14 and which is connected with a small spur gear 28 meshing with a relatively larger spur gear 30 mounted on a shaft 32 on which is also fixed a relatively smaller spur gear 34 meshing with a relatively larger spur gear 36 connected to an externally screw threaded stub shaft 38 on which the pot scrubbing or scouring disc 40 is screw threadably connected and thereby readily removable therefrom.

As shown in FIG. 6 of the drawings, the stub shaft 38 is provided with a pilot bearing portion 42 rotatably mounted in a pilot bore 44 in the shaft 24 internally of the gear 28.

A bearing side 46 of the gear 36 is axially retained against a bearing surface 48 of the housing member 16.

A seal 50 surrounds a hub 52, of the disc 40, and bears against an annular seal engaging surface 54 on the periphery thereof, while an internally screw threaded bore 56 engages external screw threads of the stub shaft 38, thus, connecting the disc 40 with the stub shaft 38, and at the same time, providing a seal to prevent water or other liquid from entering the gear train between the housing members 14 and 16 when the device is in operation. The bore 56 is closed at the lower side of the disc 40 and is open in an opposite upper end of the hub 52.

Disposed on the disc 40, as shown in FIG. 3 of the drawings, are a plurality of concentric rows of teeth or fingers 58 all directed at an angle to the axis of the disc or to the plane 60 of the disc, as shown in FIG. 4 of the drawings, these teeth are also directed generally in the direction of rotation, as indicated by the arrow A in both FIGS. 3, 4, 5 and 6 of the drawings. The teeth thus arranged in annular concentric rows at the scrubbing surface of the disc and directed at an angle to the plane of the disc and at an angle to the axis of rotation, and having pointed ends 62 directed in a direction of rotation to hold a pad or other foraminous material engaged thereby in concentric relation on the disc, the teeth impaling the pad, thereby holding it against the disc and tending to force it firmly into engagement with the scrubbing surface 60 of the disc, thus, facilitating the engagement and driving of any pad, such as an old rag, a stainless steel or copper mesh pad, a Teflon pad, a steel wool pad, or any other kind of material desired.

It will be here understood that the teeth or fingers 58 may be of nylon, Teflon, or any other substantially rigid or semi-rigid flexible character, as desired, the tough plastic materials being preferred so that they may not only be used to hold pads, but may be used directly for the rough scouring jobs, and may also be used with scouring powder.

The teeth 58 may be disposed over a substantial portion of the scrubbing surface 60 of the disc or may cover almost the entire scrubbing surface 60, if desired. The teeth 58 may thus project in an axial direction considerably beyond the surface 60 in all areas from the center to the periphery thereof.

The disc 40, as shown in the modification in FIG. 5 of the drawings, may be cast as an injection molding, whereby the teeth and the disc 40 may be of a single unitary integral construction, including the hub 52 and internal screw threads 56 which are adapted to engage the stub shaft 38. In the event the disc is cast of a single piece of material or molded, it may readily be disposable and may be very economical to replace. Accordingly, since the gear train hereinbefore described, is a reduction gear train, the disc may readily be screw threadably removed from the stub shaft 38 simply by rotating the disc 40 in a normal direction of rotation when the motor 20 is not energized. Thus, the screw threads will be disengaged and the disc 40 may rotatably be removed from the screw threaded stub shaft 38.

The screw threads 38 are directed in such a manner that they will tighten the stub shaft 38 into the screw threaded hub 52 and, thus, the shaft 38 rotates in such a direction that the disc 40 will be tightened thereon each time the motor 20 is energized.

It will be appreciated by those skilled in the art that the expendable disc 40, or semi-permanent disc 40, may be optional, depending upon the materials desired and the ultimate use of the device. However, the construction of the disc, including the rows of teeth, angularly disposed to the rotary axis and the plane of the disc and pointed in the direction of rotation, provide for the impalement of various scouring pads or other materials. And these pads may be relatively thicker than the extended dimensions of the teeth axially of the disc beyond the plane 60 so that said teeth, at their ends 62 do not extend all the way through the pad or scrubbing medium, and thereby may not even contact a surface of a pot being scrubbed. Conversely, however, these teeth may be deliberately projected through a thin pad to scrub loose materials burned on the surface of a pot which are very difficult normally to remove. The teeth 58 being of Teflon or other tough material may readily loosen material which is usually difficult to remove from a pan and these teeth may operate in conjunction with the soft structure of a cloth pad through which the teeth extend and may also cooperate with scouring powders and the pad, if desired. Further, steel wool or other material, even including a fabric Teflon pad, may be impaled by the teeth 58 and be driven thereby, as desired.

A peripheral portion 64 of the disc 40 is disposed to extend outward, even with, or slightly beyond a peripheral portion 66 of the housing portion 16, so that the periphery of the disc may be operated in corners of pans, such as annular corners adjacent to the bottom and sides or corners forming transitions with the bottoms and sides of pans. The axial elevation of the housing 10 is very nominal, and, as shown in FIGS. 1 and 2, may be substantially less than the diameter of the disc 40 so that the entire pot scrubber of the invention may be disposed in a very small pan and held by a hand of an operator. Thus, the device of the invention is so compact that the operator's hand and the pot scrubber itself may both be maneuvered around in the bottom of a small pan to scour the bottom, the sides, and the annular corner transitions between the bottoms and sides of such small pans.

During such operations, the concentric annular rows of the teeth 58 disposed at an angle to the plane of rotation and disposed at an angle to the axis of rotation impale a pad and hold it around the periphery of the disc 40 even though only a side portion of the disc may be operated and utilized in the corner of a pan.

Various prior art devices have encountered considerable difficulty in performing this operation, and at the same time holding the pad on a disc. In applicant's invention, the arrangement of the teeth hereinbefore described, provides for this function and also when the operation is over, permits the pad readily to be removed from the disc by turning the pad toward the ends 62 of the teeth and thereby the pad is readily removed when the operation of the motor 20 is terminated in accordance with the desire of the operator.

A flexible cord 68 conducts a source of low voltage to the motor 20 which is not dangerous to the operator and this cord 68 is sealed in the housing 12 and a diaphragm sealed switch in the housing is provided with a slightly protruding plunger 70. This switch is a normally open switch and may be closed to energize the motor 20 simply by pressing on the plunger 70, as desired. Thus, the housing 10 may be held in the operator's hand and the plunger 70 may be depressed by a thumb or finger of the operator thereby to control intermittently, if desired, the rotating operation of the disc 40 and whatever scouring pad or scouring materials are actuated or used in connection with or by the disc 40 and the scrubbing teeth 58, hereinbefore described.

It will be appreciated by those skilled in the art that a great variety of materials may be used to construct the disc and the teeth, or to construct a unitary structure thereof, so that the teeth may be relatively soft and tough and may be used for a great variety of purposes, even to polish or clean woodwork or other more delicate surfaces than those found in burned food surfaces of pots and pans or kitchen ovens.

The compactness of the device, as hereinbefore described, renders it very useful, particularly with respect to the periphery 64 of the disc 40 being disposed even with or outwardly of a portion of the housing in order to permit the disposition of the disc, when rotating in various hard to get at corners or recesses.

It will be obvious to those skilled in the art that various modifications of the invention may be resorted to in a manner limited only by a just interpretation of the following claims.

I claim:

1. In a power operated pot scrubber: a sealed motor housing; a motor sealed therein; a reduction gear train driven by said motor; a scrubber disc removably connected to said gear train and driven thereby; a scrubber surface of said disc; teeth carried by said disc and projecting from said scrubber surface at an angle to the axis of rotation of said disc; end portions of said teeth directed generally in the direction of rotation of said disc, said teeth of tough flexible material and adapted to impale a scouring pad, and said ends of said teeth adapted to contact and to scour an inner bottom surface of a pot, or the like.

2. In a power operated pot scrubber: a sealed motor housing; a motor sealed therein; a reduction gear train driven by said motor; a scrubber disc removably connected to said gear train and driven thereby; a scrubber surface of said disc; teeth carried by said disc and projecting from said scrubber surface at an angle to the axis of rotation of said disc; end portions of said teeth directed generally in the direction of rotation of said disc; said teeth of generally tough flexible plastic material, said teeth adapted to impale a scouring pad, and said ends of said teeth adapted to contact and to scour an inner bottom surface of a pot, or the like.

3. In a power operated pot scrubber: a sealed motor housing; a motor sealed therein; a reduction gear train driven by said motor; a scrubber disc removably connected to said gear train and driven thereby; a scrubber surface of said disc; teeth carried by said disc and projecting from said scrubber surface at an angle to the axis of rotation of said disc; end portions of said teeth directed generally in the direction of rotation of said disc; said teeth of generally tough flexible plastic material, said teeth adapted to impale a scouring pad, and said ends of said teeth adapted to contact and to scour an inner bottom surface of a pot, or the like; said teeth and said disc being molded of one piece and integral.

4. In a power operated pot scrubber: a sealed motor housing; a motor sealed therein; a reduction gear train driven by said motor; a scrubber disc removably connected to said gear train and driven thereby; a scrubber surface of said disc; teeth carried by said disc and projecting from said scrubber surface at an angle to the axis of rotation of said disc; end portions of said teeth directed generally in the direction of rotation of said disc; said teeth of generally tough flexible plastic material, said teeth adapted to impale a scouring pad, and said ends of said teeth adapted to contact and to scour an inner bottom surface of a pot, or the like; said teeth and said disc being molded of one piece and integral; said gear train having an externally screw threaded stub shaft; said disc having an internally screw threaded hub screw threaded on said stub shaft and readily removably connected therewith.

5. In a power operated pot scrubber: a sealed motor housing; a motor sealed therein; a reduction gear train driven by said motor; a scrubber disc removably connected to said gear train and driven thereby; a scrubber surface of said disc; teeth carried by said disc and projecting from said scrubber surface at an angle to the axis of rotation of said disc; end portions of said teeth directed generally in the direction of rotation of said disc; said teeth of generally tough flexible plastic material, said teeth adapted to impale a scouring pad, and said ends of said teeth adapted to contact and to scour an inner bottom surface of a pot, or the like; said teeth and said disc being molded of one piece and integral; said gear train having an externally screw threaded stub shaft; said disc having an internally screw threaded hub screw threaded on said stub shaft and readily removably connected therewith; said housing having an O-ring seal surrounding and engaging a peripheral portion of said hub portion of said disc and said screw threaded stub shaft of said gear train.

6. In a scouring disc for pot scrubbers the combination of: a substantially circular rotary disc made of thermoplastic material and having a central axis of rotation and a scrubber surface portion of said disc; teeth carried by said disc and projecting from said scrubber surface portion at an angle to said axis of rotation of said disc; end portions of said teeth directed generally in the direction of rotation of said disc; said teeth integral with said disc and of tough flexible character, said teeth adapted to impale a scouring pad, and said ends of said teeth adapted to contact and to scour an inner bottom surface of a pot, or the like; said teeth projecting a substantial distance axially beyond said scrubber surface; said disc having a hub portion projecting from an opposite side of said disc from said scrubber surface; said hub having an external annular seal engaging surface portion; said hub having an internally screw threaded bore at said disc portion and open in a direction away from said disc portion; threads of said screw threaded portion disposed and adapted to engage an externally screw threaded drive shaft and to tighten said disc on such a shaft, when said disc is driven thereby in said direction of rotation.

References Cited

UNITED STATES PATENTS

| | | | |
|---|---|---|---|
| 1,350,059 | 8/1920 | Blackwell | 15—363 X |
| 1,984,990 | 12/1934 | Reineman | 15—230.17 |
| 2,008,260 | 7/1935 | Reineman | 15—230.17 X |
| 3,067,549 | 12/1952 | Laverdisse | 15—230.17 |
| 3,074,089 | 1/1963 | Brown | 15—49 |
| 3,087,078 | 4/1963 | Brown | 15—49 X |
| 3,115,660 | 12/1963 | Hunt | 15—230.17 |
| 3,302,232 | 2/1967 | Wasiloff et al. | 15—230.17 |

FOREIGN PATENTS

| | | |
|---|---|---|
| 359,614 | 2/1962 | Switzerland. |
| 80,153 | 2/1963 | France. |

CHARLES A. WILLMUTH, *Primary Examiner.*

L. G. MACHLIN, *Examiner.*